Nov. 15, 1932. E. J. SHAFFER 1,887,877
HOSE COUPLING
Filed June 1, 1931 2 Sheets-Sheet 1
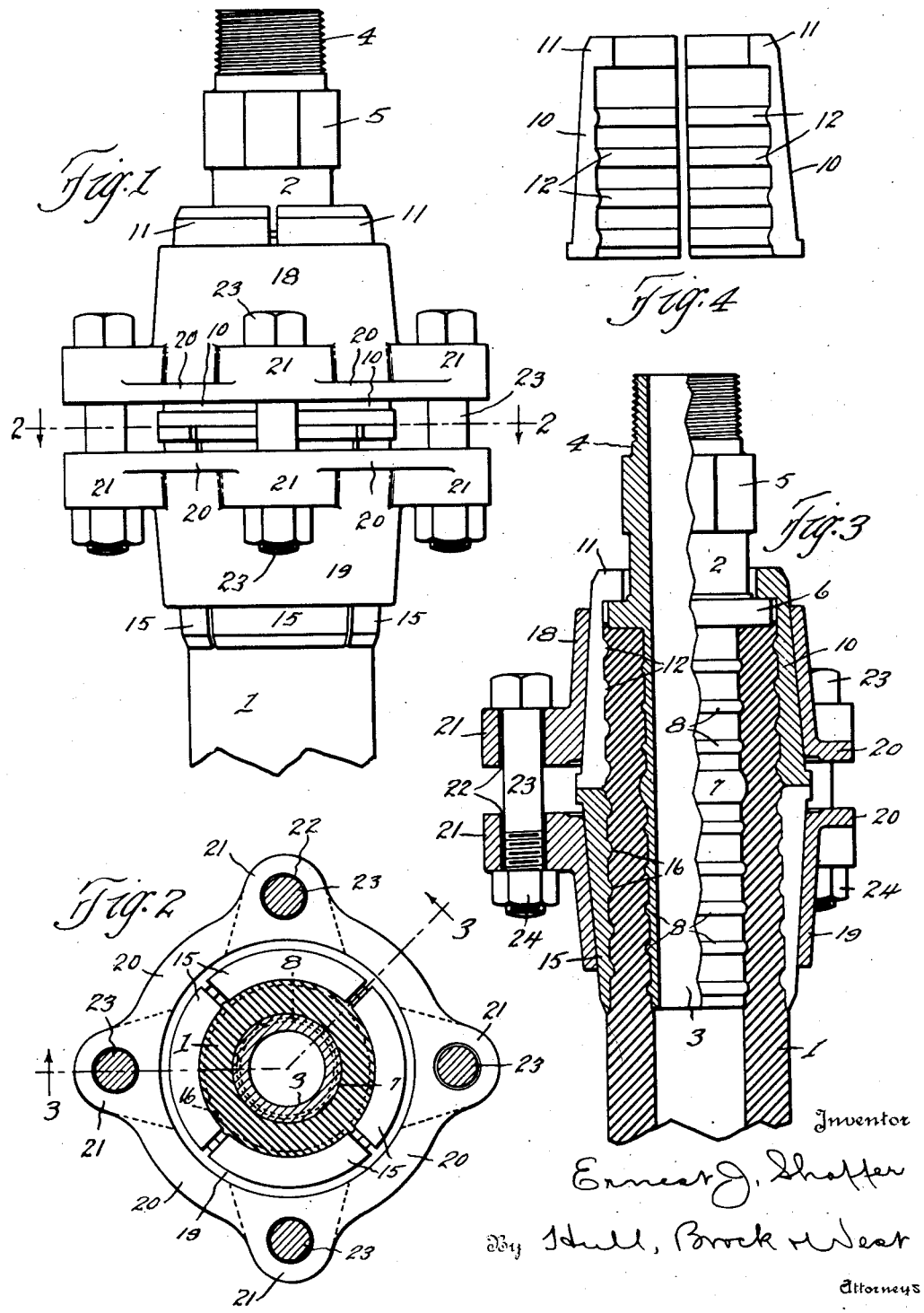

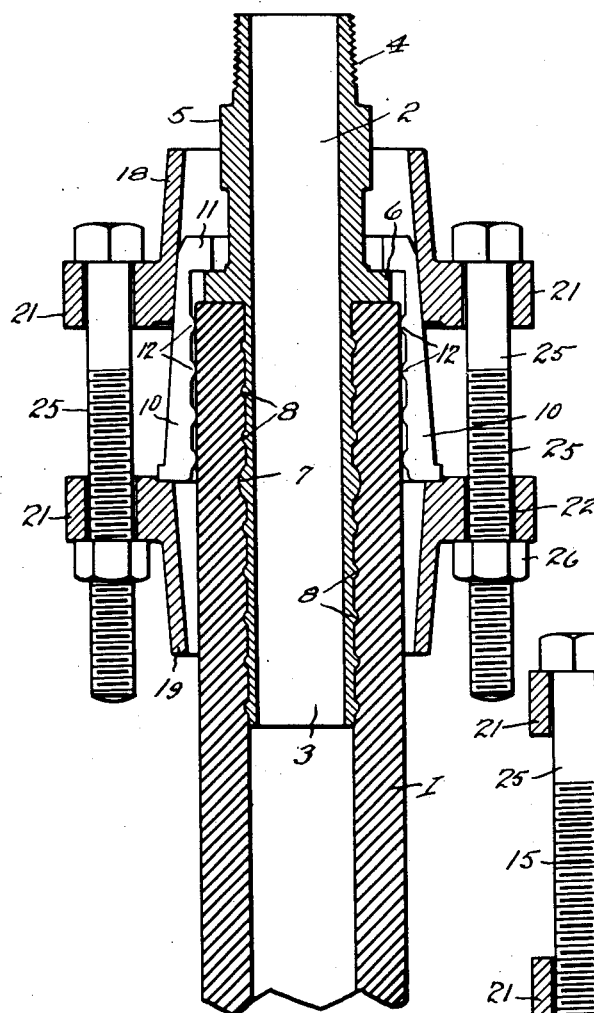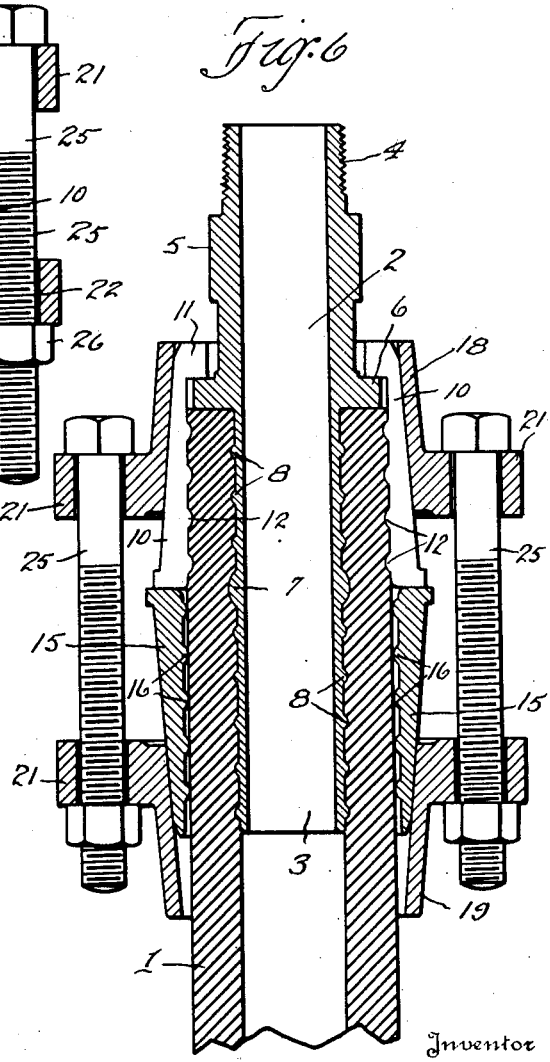

Patented Nov. 15, 1932

1,887,877

UNITED STATES PATENT OFFICE

ERNEST J. SHAFFER, OF OKLAHOMA CITY, OKLAHOMA, ASSIGNOR TO GEORGE W. SHAFFER, OF TULSA, OKLAHOMA

HOSE COUPLING

Application filed June 1, 1931. Serial No. 541,265.

This invention relates to improvements in hose couplings, and particularly to a novel clamp for securing the end of a flexible hose to a coupling member.

The invention is intended for use in situations where very high pressures are encountered, as, for example, in rotary well drilling operations. To those acquainted with this class of work it is known that at times pressure within the hose builds up very rapidly from a normal pressure of around 800 pounds to one of several thousand pounds; and it is the primary purpose of my invention to provide a construction for a hose coupling that will effect a leak-proof joint between the hose and coupling member which will successfully withstand such high pressure and that will not blow off under the strain thereof.

Other objects are to provide a coupling that is very substantial and durable; that is thoroughly reliable; that is relatively simple and is very convenient of application to a hose; and that has no injurious effect upon the portion of the hose that is clamped to the coupling member, wherefore such member—the only part susceptible to wear—may be replaced without cutting off the end of the hose. This is important as it avoids having to shorten the hose sections which, if repeated but a few times, would destroy the utility of such sections for the purpose intended.

Other objects and advantages will appear as I proceed to describe the invention in detail by reference to the accompanying drawings wherein Fig. 1 is an elevational view showing a coupling member secured to the end of a hose section in accordance with my invention; Fig. 2 is a section on the line 2—2 of Fig. 1; Fig. 3 is a longitudinal section through the parts illustrated in Fig. 1, the planes of section on opposite sides of the vertical center line being at an angle to each other, as indicated by the section line 3—3 of Fig. 2; Fig. 4 is a detail of the outer slips; and Figs. 5 and 6 are views illustrating the manner of applying the clamp to the hose.

In the drawings, where like numerals designate corresponding parts throughout the several views, 1 represents, conventionally, a portion of hose, which may be composed of a rubber and canvas or other suitable reinforcing fabric, and 2 designates a coupling member or nipple including a relatively long tubular portion or shank 3 that is forced into the end of the hose. The end of the nipple 2 opposite the shank 3 is designed to provide a coupling part 4 which, in the present instance, consists of an externally threaded boss that is adapted to be received by a complementary coupling part (not shown), as will be readily understood. Inwardly of its threaded extremity 4, the nipple is formed with a wrench receiving portion designated 5. Intermediate the shank 3 and coupling part 4, the nipple 2 is provided with a circumferential flange 6 which is arranged to engage the end of the hose 1 when the shank 3 is properly inserted. The shank 3 is surrounded near its longitudinal center by a comparatively wide and deep bead 7, and on each side of said bead it is formed with a series of circumferential ribs 8.

Surrounding the end of the hose is what I choose to term an outer set of slips 10 having inwardly directed lips 11 at their outer ends which are engaged over the flange 6 of the nipple 2. The inner surfaces of the slips are provided with transverse ribs 12, while their outer surfaces diverge toward the inner ends of the slips. The slips are definitely positioned with respect to the nipple 2 by the cooperation of the lips 11 of the former with the flange 6 of the latter, and the outer series of ribs 8 of the nipple are so spaced as to occupy planes substantially midway between the planes of the ribs 12 of the slips. An inner set of slips 15 surround the hose inwardly of the set 10 and their outer ends abut the inner ends of the outer slips. It will be noted that the plane of contact between the two sets of slips is coincident with the central plane of the bead 7 of the nipple. The advantage of this will presently be explained. The slips of the set 15 are formed on their inner sides with ribs 16 that are spaced substantially equal distances on opposite sides of the planes of the inner series of ribs 8 on the nipple. The outer surfaces of the inner slips diverge outwardly or in a direction toward the outer set.

Each set of slips may consist of any desired number, four being my present preference, as best shown in Fig. 2, and the lines of separation between the slips of one set are preferably staggered with respect to those of the other set, so as to avoid continuity of such line of separation from one end of the clamp to the other.

Sleeves 18 and 19 surround the respective sets of slips 10 and 15, and they are tapered to correspond approximately to the taper of the slips, and the inner ends of the sleeves are surrounded by flanges 20 and are provided with substantial ears 21 having bolt holes 22. The two sleeves are arranged with their ears 21 in alignment, and bolts 23 are engaged through the holes 22 thereof and have nuts 24 applied to their threaded ends. By means of these bolts the sleeves are drawn toward each other to urge the slips inwardly and firmly clamp between them and the shank 3 the intervening wall of the hose.

The manner of applying the clamp to the hose is illustrated in Figs. 5 and 6. Referring to Fig. 5: after the shank 3 of the nipple 2 has been inserted into the hose 1 until the flange 6 engages the end of the hose, the inner sleeve 19 is placed over the hose and the slips of the outer set 10 are arranged about the end of the hose with their lips 11 bearing on the outer side of the flange 6, after which the sleeve 18 is placed over the outer ends of the slips. The sleeve 19 is next engaged with the inner ends of the slips, and the two sleeves 18 and 19 are arranged with their ears 21 in alignment, and relatively long bolts 25 are inserted through the holes of the ears and nuts 26 are applied to their threaded ends. The nuts 26 are now drawn up until the sleeve 18 is forced inwardly over the slips of the set 10 sufficiently to firmly clamp the end of the hose between said slips and the outer portion of the shank 3, as shown in Fig. 6. The outer slips and sleeve 18 are then left where they are and the nuts 26 are backed off so as to permit the sleeve 19 to be drawn inwardly a considerable distance. The slips of the inner set 15 are then inserted between the sleeve 19 and the wall of the hose 1 with their outer ends engaging the inner ends of the outer slips and with the line of separation between them staggered with respect to the corresponding lines of the outer set of slips. The assembling of the parts has advanced to this stage in Fig. 6. Now, the nuts 26 are again drawn up to force the inner sleeve 19 outwardly and contract the slips of the inner set so as to firmly clamp the wall of the hose between them and the inner end of the shank 3. This may be continued until the inner sleeve 19 bears substantially the same relation to the inner set of slips as the outer sleeve 18 bears to the outer set. The nuts 26 may now be removed and the bolts 25 withdrawn and the shorter bolts 23 substituted therefor. By drawing up the nuts 24 onto the bolts 23 sufficiently, the sleeves 18 and 19 may be drawn to their final positions, as indicated in Figs. 1 and 3. In this final drawing up of the sleeves and the contraction of the slips, the material of the clamped portion of the hose is displaced to its maximum so that when the hose is later subjected to high internal pressure and elongated as a consequence thereof and its wall drawn out to a thinner cross section, it will not affect the very secure hold which the clamp has on the hose.

By virtue of the ribs on the shank of the nipple and on the inner surfaces of the slips, and especially by reason of the relatively wide and deep bead 7 that surrounds the nipple in the region of the meeting ends of the two sets of slips, a very effective and thoroughly leak-proof joint is made between the hose and nipple. The bead 7 being of greater diameter than the ribs 8, makes the joint in this region especially tight. Also, because of the fact that the lines of separation between the respective slips of the inner and outer sets are offset or staggered with respect to each other, any possibility of leakage or seepage incurring along these lines under high internal pressure is eliminated.

It is evident from the nature and function of the slips, as hereinbefore described, that they will have no injurious effect upon the hose, and on account of this, when a nipple becomes worn out or damaged in any way it may be removed and a new nipple substituted without the necessity of cutting off the end of the hose. This obviates the need of shortening the hose when making such repairs.

It is desirable to have the inner ends of the sleeves spaced some distance from the corresponding ends of the slips when the parts are in final clamping condition, as illustrated in Figs. 1 and 2; and in case the walls of some sections of hose are too thin to bring about this desirable effect, the hose may be wrapped with suitable material before applying the slips.

Having thus described my invention, what I claim is:

1. In a hose coupling, the combination of a nipple including a coupling part at one end and a shank at the other, the shank being adapted to be inserted into a hose, an outer and an inner set of slips surrounding the hose in the region of the shank and arranged in opposed relation to each other, the outer ends of the slips of the outer set having holding engagement with the nipple, the outer surfaces of the slips of each set diverging in the direction of the other set, a sleeve surrounding each set of slips, and means for forcing the sleeves toward each other.

2. In a hose coupling, the combination of a nipple including a coupling part at one end, a shank at the other, and a circumferential flange between said part and shank, the shank being adapted to be inserted into a hose, an outer and an inner set of slips surrounding the hose in the region of the shank and arranged in opposed relation to each other, the outer ends of the slips of the outer set having lips extending inwardly over the aforesaid flange, the outer surfaces of the slips of each set diverging in the direction of the other set, a sleeve surrounding each set of slips, and means for forcing the sleeves toward each other.

3. In a hose coupling, the combination of a nipple including a coupling part at one end, a shank at the other, and a circumferential flange intermediate its ends, the shank being adapted to be inserted into a hose with the end of the latter abutting the inner side of said flange, an outer set of slips surrounding the hose and having lips engaged over the outer side of said flange, an inner set of slips surrounding the hose and having their outer ends arranged in opposed relation to the inner ends of the outer slips, the outer surfaces of each set of slips diverging in the direction of the other set, a sleeve surrounding each set of slips, the inner surface of each sleeve being tapered to correspond to the taper of the outer surface of the slips wherewith it is arranged to engage, and means for forcing the sleeves toward each other.

4. In a hose coupling, the combination of a nipple including a coupling part at one end, a shank at the other, and a circumferential flange intermediate its ends, the shank being adapted to be inserted into a hose with the end of the latter abutting the inner side of said flange, an outer set of slips surrounding the hose and having lips engaged over the outer side of said flange, an inner set of slips surrounding the hose and having their outer ends arranged in opposed relation to the inner ends of the outer slips, the outer surfaces of each set of slips diverging in the direction of the other set, a sleeve surrounding each set of slips, the adjacent ends of the two sleeves having perforated ears, and bolts extending through the corresponding ears of the two sleeves for drawing said sleeves toward each other.

5. In a hose coupling, the combination of a nipple including a coupling part at one end, a shank at the other, and a circumferential flange intermediate its ends, the shank being adapted to be inserted into a hose with said flange engaging the end thereof and being surrounded at a point between said flange and its inner end by a bead of substantial width and diameter, the shank being formed on opposite sides of said bead with spaced apart circumferential ribs, an outer set of slips surrounding the hose and having lips engaged over the outer side of the aforesaid flange, an inner set of slips surrounding the hose and having their outer ends engaging the inner ends of the outer slips in substantially the central plane of the aforesaid bead, each set of slips having transverse ribs on their inner sides which are spaced on opposite sides of the planes of the ribs on the shank, the outer surfaces of each set of slips diverging in the direction of the other set, a sleeve surrounding each set of slips, and means for forcing the sleeves toward each other.

In testimony whereof, I hereunto affix my signature.

ERNEST J. SHAFFER.